Feb. 21, 1956    R. GUILLEMINOT    2,735,227
CONTINUOUS MANUFACTURE OF CORRUGATED GLASS SHEETS
Filed Sept. 25, 1953    2 Sheets-Sheet 1

Feb. 21, 1956  R. GUILLEMINOT  2,735,227
CONTINUOUS MANUFACTURE OF CORRUGATED GLASS SHEETS
Filed Sept. 25, 1953  2 Sheets-Sheet 2

Inventor
Roger Guilleminot
By Young, Emery & Thompson
Attys.

2,735,227

CONTINUOUS MANUFACTURE OF CORRUGATED GLASS SHEETS

Roger Guilleminot, Paris, France

Application September 25, 1953, Serial No. 382,441

Claims priority, application France October 7, 1952

3 Claims. (Cl. 49—3)

In patent application Serial Number 258,311 of the 27th of November 1951 there were described improvements in the continuous manufacture of corrugated glass sheets, according to which the pouring of the glass in paste form over a moving corrugated surface is combined with the placing over the glass of an element having convex parts engaging in the concave parts of the corrugations and effecting contact between the glass and the moving surface. This shaping element, placed over the glass at the moment when the latter is poured on to the moving surface, moves with the latter, without relative movement, over a suitable distance, which is preferably shorter than the pitch of the corrugations, and is then returned to the original position.

In one form of construction of the shaping element which cooperates in this manner with the corrugated suface, it was indicated as being constituted by a support equipped with rollers, the bottom part of the rollers forming the convex parts which come into contact with the glass.

The present invention has as object an improvement to this arrangement, according to which the rollers systematically receive a movement of rotation on themselves. This movement of rotation imparted to the rollers has two purposes. On the one hand, it enables the rollers to roll over the glass without friction at the moment when they come into or out of contact with the glass, so that they avoid any tearing or deformation of the glass while it is still fragile, because it is still pasty and has not finished its final hardening.

In the second place, in consequence of the rotation of the rollers on themselves, contact between the rollers and the hot glass is not always made at the same part of the rollers. The heating of the rollers is distributed over their entire surface. The same contact zone can be cooled before being again applied to the hot glass. As a result, the deformation of the rollers due to unequal expansion of the various zones of their surface is avoided, and their performance and useful life are improved.

It is advantageous to rotate simultaneously all the rollers carried by the support. To this end, the rollers are interconnected to receive the same rotation when only one of them is driven. This drive is in turn interconnected with the movements of the support, in rhythm therewith.

The accompanying drawings illustrated by way of example how the improvement of the invention may be carried out.

Figure 1:
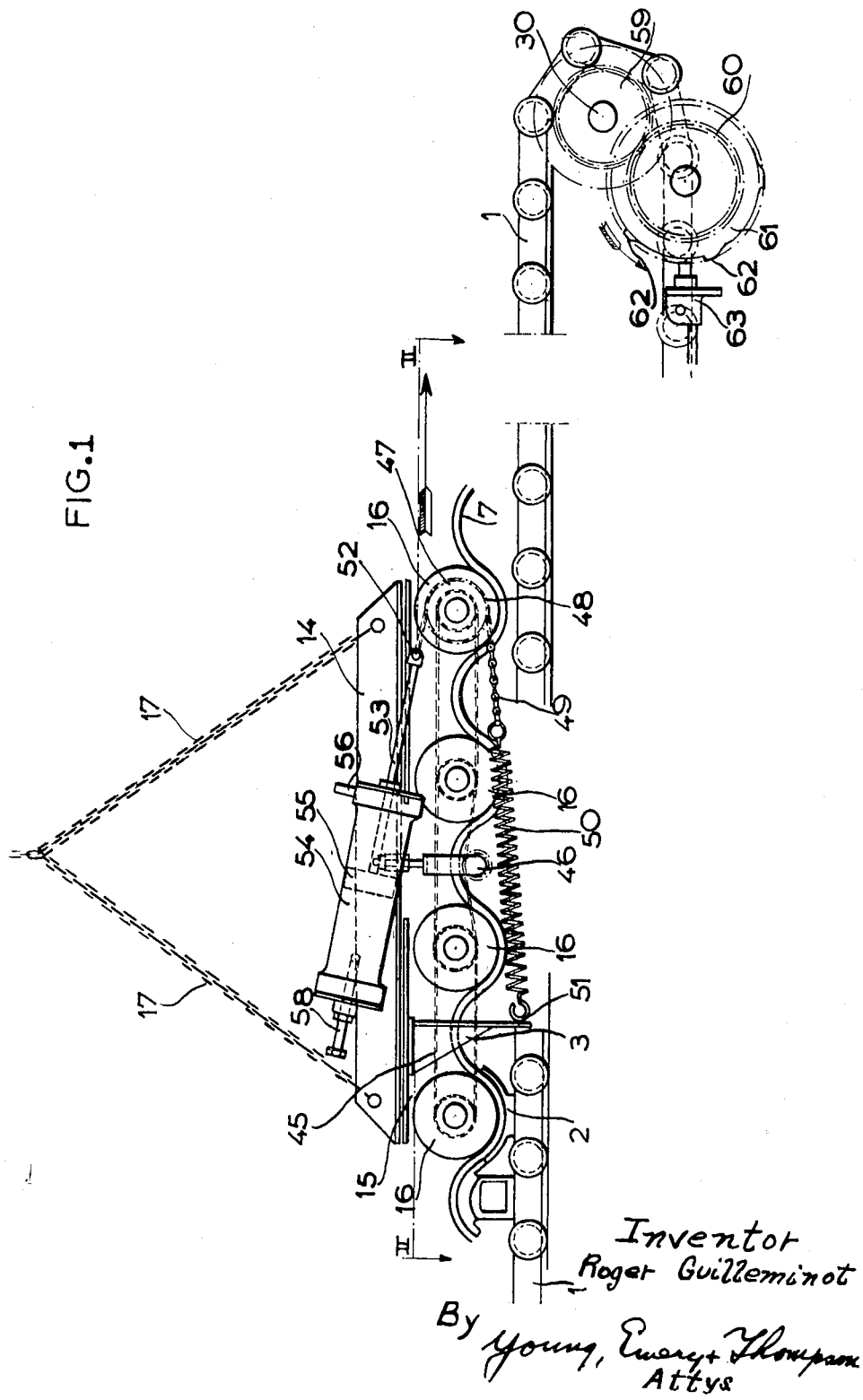
Figure 1 is a side elevation.
Figure 2:
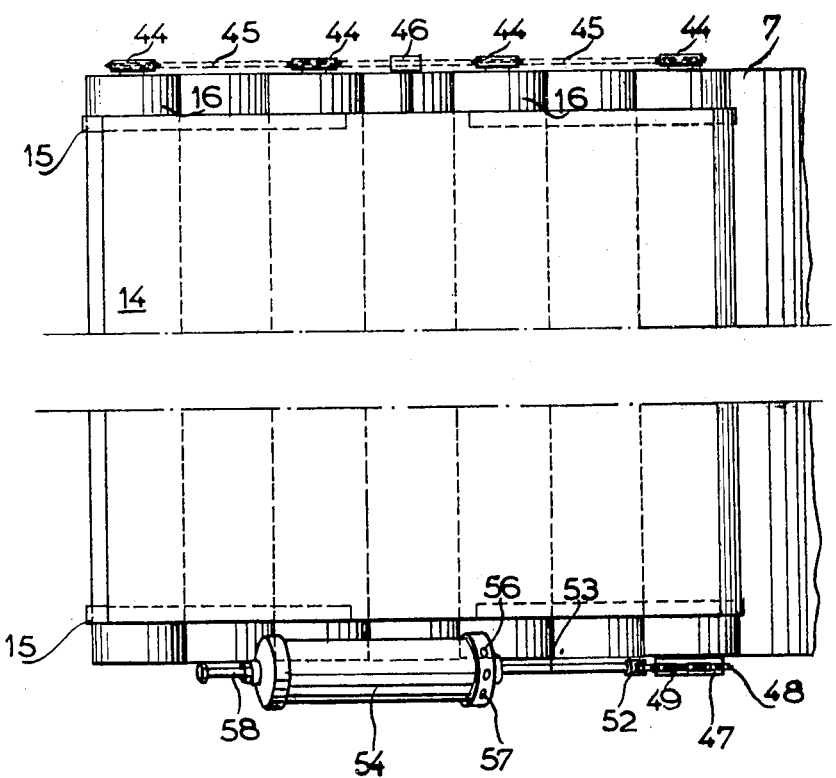
Figure 2 is a view in horizontal section along the line II—II in Figure 1.

In these figures, the same essential elements are found, and with the same reference numerals, as in the arrangement of patent application Serial Number 258,311; the endless chain 1 carrying the concave elements 2 and convex elements 3, which by their juxtaposition form the corrugated surface which gives shape to the glass sheet 7. The endless chain 1 may be constructed in accordance with the disclosure in my Patent No. 2,682,137. The shaper element comprising a frame 14 with supports 15 carrying the rollers 16 is placed on the glass in course of cooling. The frame 14 is suspended on chains 17 connecting it to the mechanism controlled in the manner described in Patent application Serial Number 258,311.

According to the arrangement of Patent application Serial Number 258,311, the rollers 16 are adapted to turn freely on themselves, particularly at the moment when they come into contact with the glass and at the moment when they break off contact therewith.

According to the present invention, the rollers 16 systematically receive a movement of this type, which may be automatically controlled as a function of the forward movement of the chain 1 in conjunction with the elements controlling the rise and fall of the carriage 14.

To this end, the rollers 16, composed of tubes turning in the supports 15, carry on one side the toothed wheels 44, all these wheels 44 being connected together by a chain 45, for example of the Galle chain type. All the rollers 16 are thus rotated together and simultaneously turn through the same angle. A means of tensioning the chain 45 is provided at 46, fixed to the frame 14.

One of the rollers 16, for example the last roller in the direction of movement of the chain 1, receives the rotational drive, which is transmitted to the other rollers through the chain 45. For this purpose, said roller carries at the opposite end to that provided with the wheel 44 a detent mechanism 47 similar to a freewheel in a bicycle. This freewheel is driven by a second toothed wheel 48, in turn driven by a chain 49. This chain is attached at one end to a return spring 50 fixed to a bracket 51 secured to the frame 14. At the other end it is attached at 52 to the rod 53 of a compressed air driving means 54. The device 54 consists, for example, of a cylindrical casing in which a piston 55 moves, to which the rod 53 is fixed.

The movements of the piston 55 are controlled by the admission or discharge of compressed air through the branches 56, 57. A regulating stop 58 enables the magnitude of the movements of the piston 55 to be regulated.

The admission of compressed air to the cylinder 54 through 56 is controlled by the actual movement of the chain 1. The axle 30 driving the chain carries, in addition to the parts described in the main patent application, a toothed wheel 59 driving a toothed wheel 60 solid with a cam 61, the appropriate sloping flanks 62 of which operate a distributor cock 63, which admits compressed air at 56.

Each time the frame 14 is raised for the purpose of moving it back and cause it to carry out a fresh glass shaping operation, compressed air is admitted at 56. The piston is driven back, driving the rod 53 and pulling the chain 48, thereby causing the end roller 16 to turn a predetermined angle. Through the chain 45, and the wheel 44, this roller drives all the other rollers, which turn the same angle. The zone of the rollers which in the next phase comes into contact with the glass is thus not the same. A different part of the rollers is heated by contact with the glass, while the part previously heated is cooled.

When the pressure of the compressed air admitted at 56 is stopped, the piston 55 returns to the rear under the action of the spring 50, but without driving the rollers, because of the freewheel 47.

In this arrangement the rollers 16 are also able to turn freely on themselves at the moment when they make contact with the glass, this turning taking the form of rolling without friction until the rollers have reached the bottom of the concave parts of the corrugated glass.

The above described structural arrangements naturally are not of a limitative character. They could be replaced by any other equivalent arrangements imparting to the roller a rotation interlinked with their cycle of operations.

What I claim is:

1. In an apparatus for the continuous manufacture of corrugated sheets of glass comprising a movable endless chain having a continuous movement and being composed of alternate concave and convex members brought together so as to form a continuous corrugated surface on to one extremity of which is introduced a rolled glass sheet, a shaping device comprising a movable support, rollers mounted on the said support, connection means coupled to the said rollers in such manner that the rotation of each of the said rollers is exactly the same, driving means for at least one of the said rollers, said means being mounted on the movable support, a vertically-movable suspension for the said movable support, and means actuating the said driving means by the movement of the endless chain.

2. In an apparatus for the continuous manufacture of corrugated sheets of glass, comprising a movable endless chain having a continuous movement and being composed of alternate concave and convex members brought together so as to form a continuous corrugated surface, on to which, at one extremity, there is brought a sheet of rolled glass, a shaping device adapted to be lowered on to the sheet of glass and again to be raised at regular intervals and moving with the said sheet during a travel of a few corrugations, this device comprising a movable support, rollers mounted on the said support, a toothed wheel fixed to each roller, a chain serving to connect the said toothed wheels of all the said rollers to each other, a second toothed wheel mounted on at least one of the said rollers, a chain partly engaged on the said second toothed wheel, an elastic device coupled to one extremity of the said chain, a compressed air device mounted on the movable support and adapted to actuate the other extremity of the said chain, a vertically-moving suspension for the said movable support, and means for actuating the compressed air device by the movement of the endless chain.

3. In an apparatus for the continuous manufacture of corrugated sheets of glass comprising a movable endless chain having a continuous movement and being composed of alternate concave and convex members brought together so as to form a continuous corrugated surface on to one extremity of which is introduced a sheet of rolled glass, a shaping device adapted to be lowered on to the sheet of glass and to be raised again at regular intervals and moving with the said sheet during a travel less than the length of one corrugation, the said device comprising a movable support, rollers mounted on the said support, a toothed wheel fixed to each roller, a chain serving to connect the said toothed wheels of all the said rollers to each other, a second toothed wheel mounted on at least one of the said rollers, a chain partly engaged on the said second toothed wheel, an elastic device coupled to one extremity of the said chain, a compressed air device mounted on the movable support and adapted to actuate the other extremity of the said chain, a vertically-moving suspension for the said movable support, a distributor for operating the said compressed air device, and a cam driven by the motion of the endless chain and adapted to actuate the said distributor.

References Cited in the file of this patent
UNITED STATES PATENTS

| | | |
|---|---|---|
| 1,450,222 | Pattison | Apr. 3, 1923 |
| 1,483,452 | Keyes | Feb. 12, 1924 |
| 2,590,768 | Guilleminot et al. | Mar. 25, 1952 |
| 2,655,196 | Magnani | Oct. 13, 1953 |